United States Patent [19]

Han

[11] Patent Number: 5,226,074
[45] Date of Patent: Jul. 6, 1993

[54] REMOTE CONTROL METHOD OF A FACSIMILE DEVICE

[75] Inventor: Sang-Ho Han, Taegu, Rep. of Korea

[73] Assignee: SamSung Electronics Co., Ltd., Suwon, Rep. of Korea

[21] Appl. No.: 649,006

[22] Filed: Jan. 25, 1991

[30] Foreign Application Priority Data

Aug. 29, 1990 [KR] Rep. of Korea .............. 1990-13409

[51] Int. Cl.[5] .................... H04M 11/00; H04N 1/32
[52] U.S. Cl. .................................. 379/100; 379/102; 379/105
[58] Field of Search ............. 379/100, 102, 104, 105, 379/96, 97, 98, 93; 358/400, 442, 443, 444

[56] References Cited

U.S. PATENT DOCUMENTS 4,974,255 11/1990 Defay et al. ................... 379/102
5,125,025 6/1992 Lim ................................ 379/100

Primary Examiner—Thomas W. Brown
Assistant Examiner—Stella L. Woo
Attorney, Agent, or Firm—Bushnell, Robert E.

[57] ABSTRACT

A method for interactively diagnosing and controlling a state of a remote facsimile device which communicates with a center facsimile device of an after-service center by using non-standard format by writing or reading data into or from memory includes the steps of: requesting entry of a telephone number of the remote facsimile device after determining a remote control mode exists when a function key is pressed; checking whether a memory reading or writing mode is selected and determining whether a remote diagnosis process, a name registration process, a telephone number registration process and an option reading process are selected. When the above processes are selected respectively, each process is performed and results are printed. If, however, the option reading process was not selected, the method proceeds to a memory reading process for repeatedly performing the foregoing steps.

10 Claims, 7 Drawing Sheets

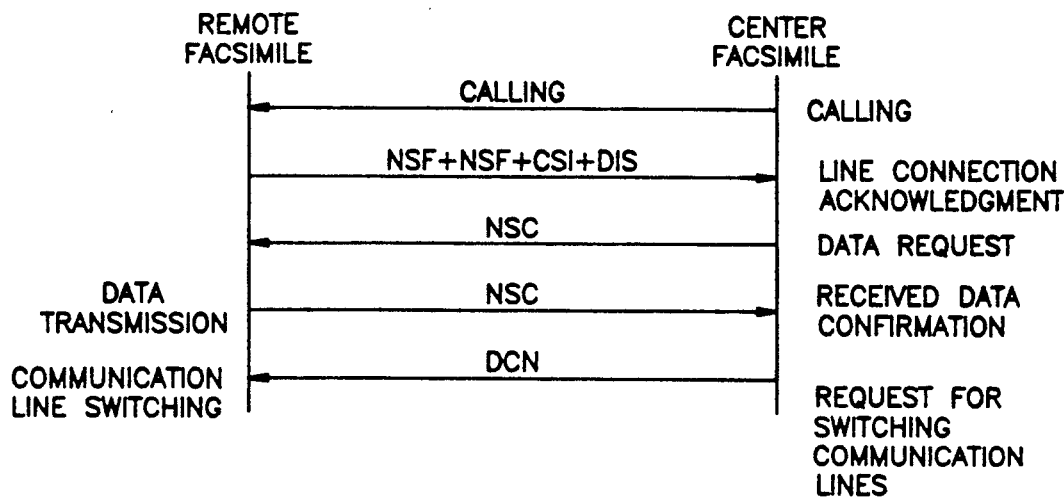
FIG. 5
| REQUEST CODE | MEMORY HEADER ADDRESS | NUMBER OF REQUEST DATA BYTE | DATA | END CODE |
FIG. 6A
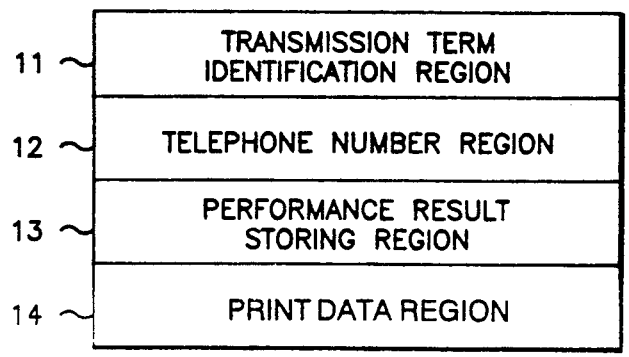
FIG. 6B

REMOTE CONTROL METHOD OF A FACSIMILE DEVICE

BACKGROUND OF THE INVENTION

The present invention relates to a remote-control method for a center facsimile device, and more particularly to a method for diagnosing and controlling a remote facsimile device by communicating with the facsimile device in a remote location using a non-standard format recommended by CCITT (the international telegraph and telephone consultative committee) regulation. Currently facsimile device are spread widely from businesses to homes, and they are on great demands nowadays. Further, ROM (Read Only Memory) versions of software and models of facsimile devices are becoming more diverse. Especially, the spread of low cost facsimile devices with no display devices such as liquid crystal display (hereafter referred to as LCD) window is increasing exponentially. Accordingly, it is increasingly expected that users will request the After-Service centers for confirming the telephone number, name and option setting of each remote facsimile devices. In prior art, when a problem arises during operation, or when the system malfunctions, an After-Service (hereinafter referred to as A/S) worker must visit each remote location to diagnose and repair the remote facsimile devices, thus causing higher service cost and longer service time.

SUMMARY OF THE INVENTION

It is accordingly an object of the present invention to provide a method for interactively diagnosing and controlling the state of remote facsimile devices which communicate with center facsimile devices of A/S centers by using non-standard format recommended by CCITT regulation.

It is another object of the present invention to provide a method for remotely diagnosing and controlling the state of a remote facsimile device, by writing or reading data into or from memory by using allocated region of built-in memory.

It is still another object of the present invention to provide a control method for easily identifying, by printing each result of operation on paper according to the type of remote-control.

According to the present invention, the method for remotely controlling the remote facsimile device requests for entering the telephone number of a remote facsimile device after checking the establishment of the remote control mode in the center facsimile device when a function key is pressed, and checks whether memory reading and writing modes are selected. And then, the method checks whether a remote diagnosis process, a name registration process, a telephone number registration process or and option reading process is respectively selected. When the above processes are selected respectively, each of the processes is performed and the results are printed. If, however, the above option reading process was not selected, the method proceeds to the memory reading process for repeatedly performing the foregoing procedures.

BRIEF DESCRIPTION OF THE DRAWINGS

For a better understanding of the invention and to show how the same may be carried into effect, reference will now be made, by way of example, to the accompanying diagrammatic drawings, in which:

FIG. 5 is a description drawing of transmission controlling protocol according to the present invention; and FIGS. 6A and 6B are a data format and a memory map according to the present invention.

DETAILED DESCRIPTION OF A PREFERRED EMBODIMENT

Figure 1:
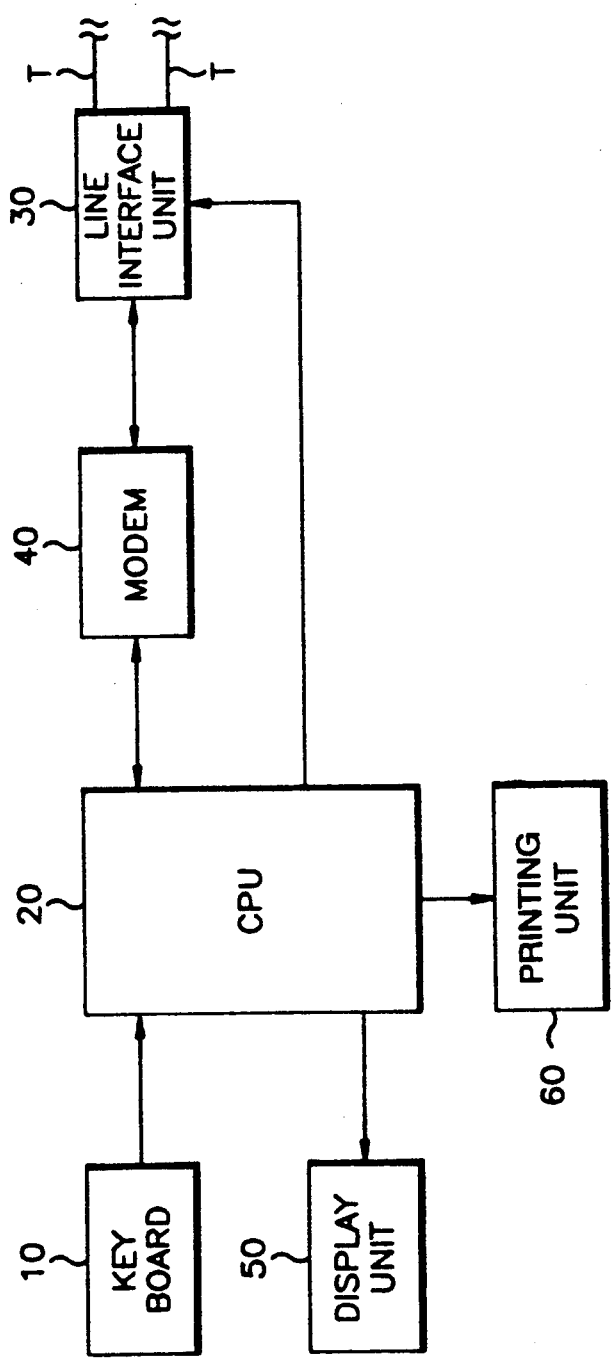
FIG. 1 is a block diagram of a remote-control fascimile device according to the present invention.

Referring to FIG. 1, the remote-control facsimile device includes a keyboard 10. A central processing unit (hereinafter referred to as CPU) 20 controls the remote-control facsimile device according to key inputs supplied from the keyboard 10. A line interfacing unit (hereinafter refer to as LIU) 30 interfaces the signals received and transmitted via transmission line T, according to control of the CPU 20. A modem 40 attached between the CPU 20 and LIU 30 modulates and demodulates the input/output signals into/from the CPU 20. A display unit 50 displays various information according to the control of the CPU 20. A recording unit 60 prints various information according to the control of CPU 20.

The operation of the inventive system will now be described with reference to FIGS. 2A-2C, 3 and 4.

Figure 2A:
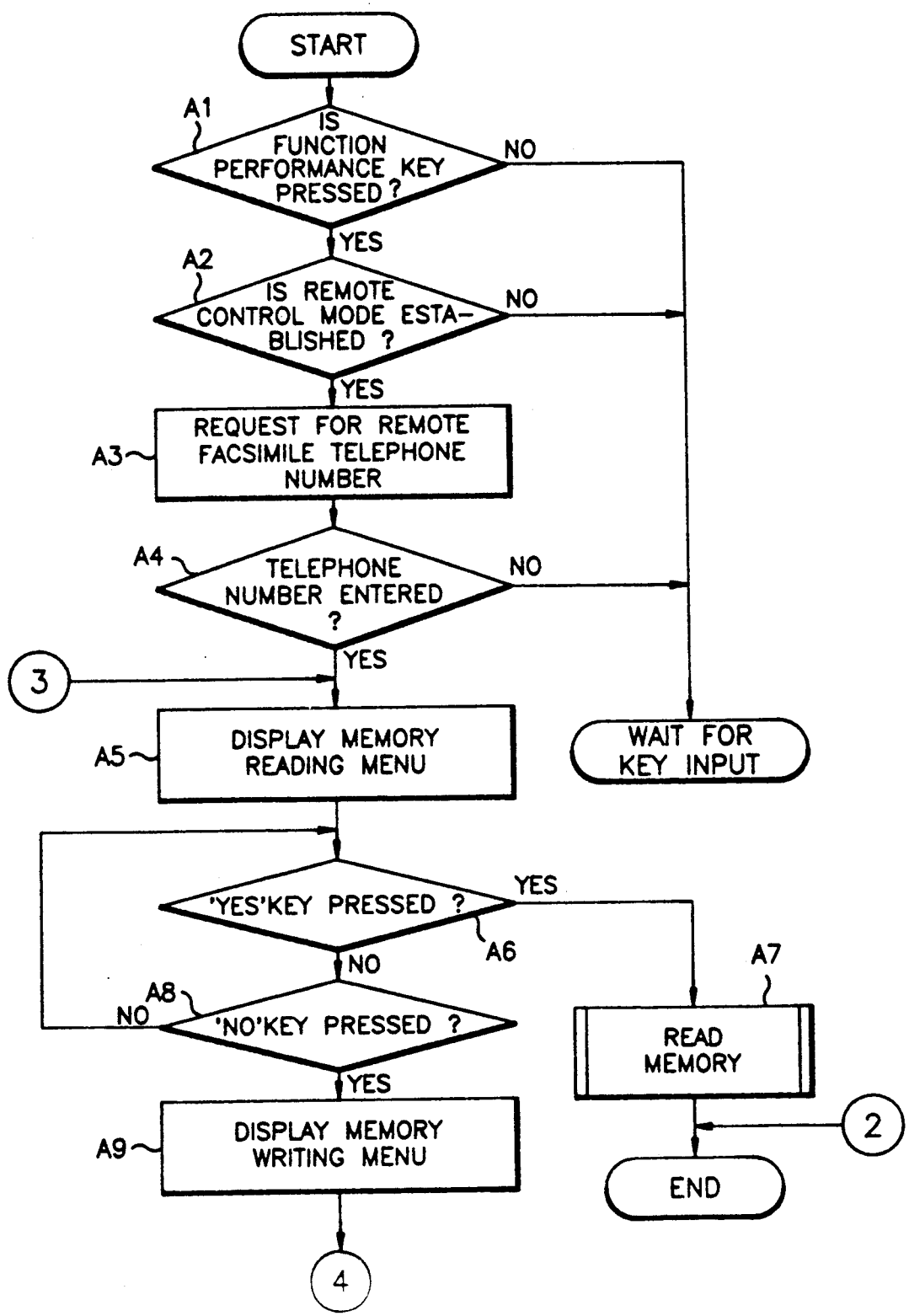
FIGS. 2A-2C show a flow diagram of a method of a system including the remote-control facsimile device according to the present invention.
Figure 2B:
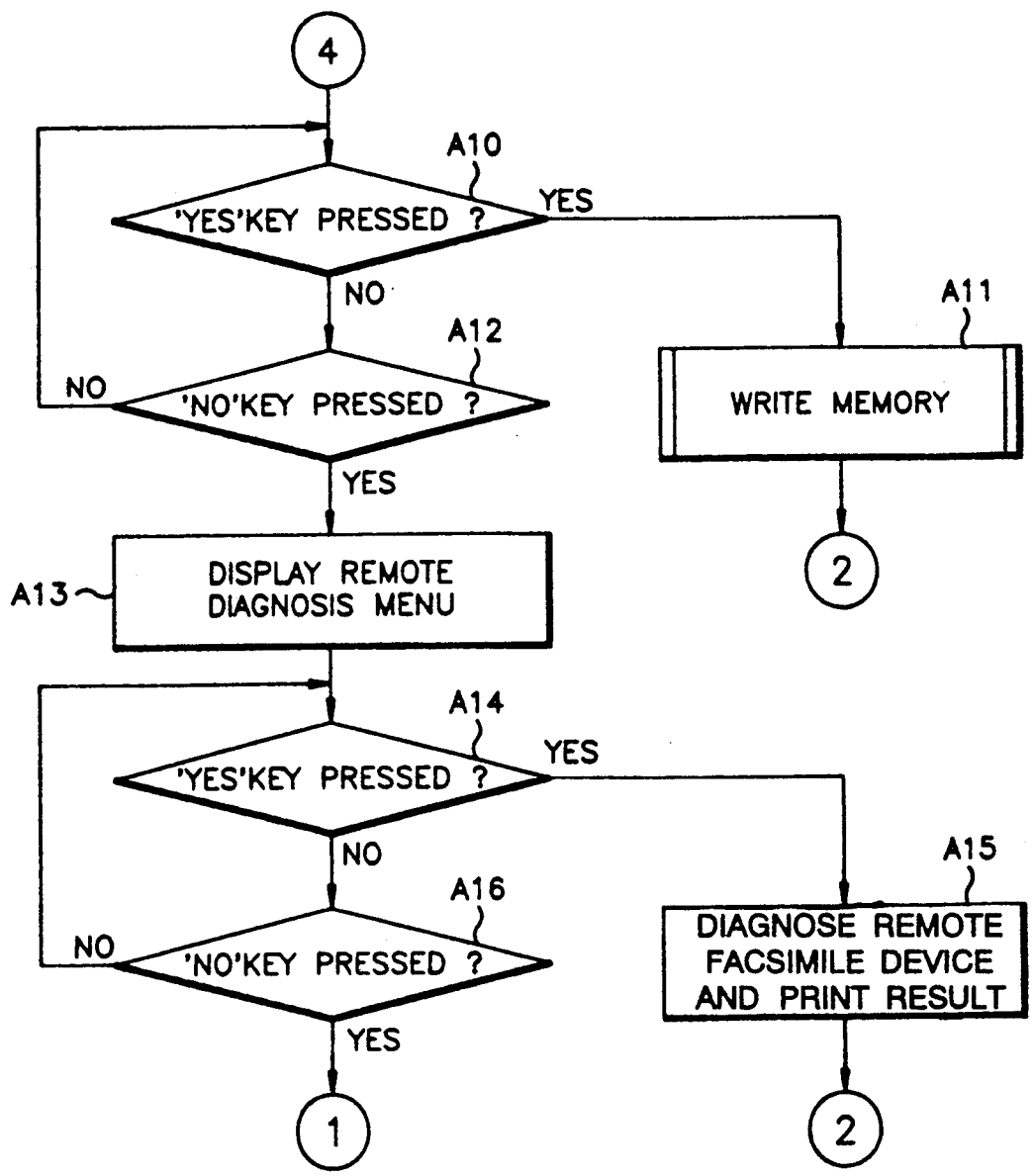
Figure 2C:
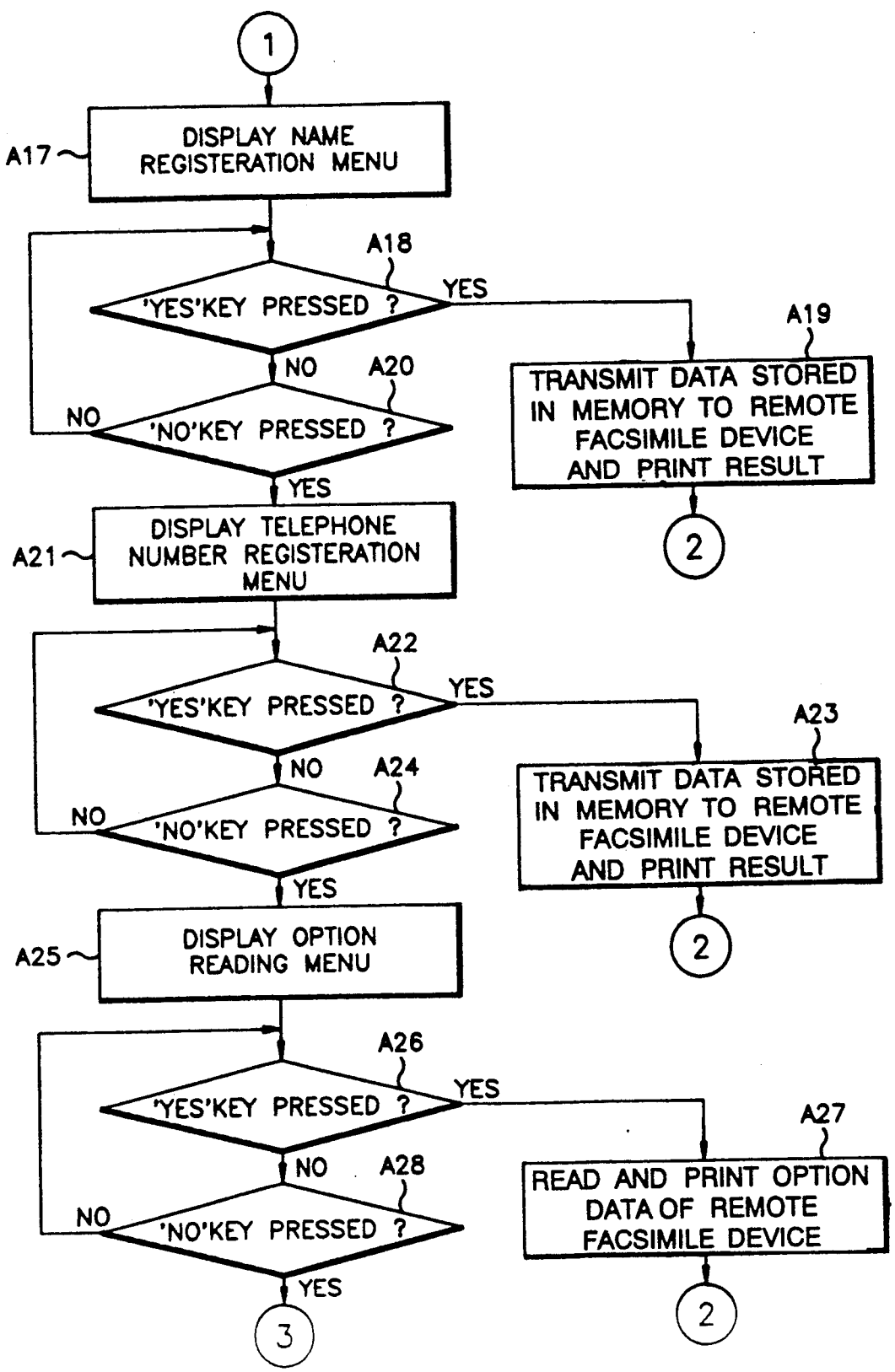

Referring to FIGS. 2A-2C, in a first step, when a function performance key is pressed, a determination is made whether the remote-control facsimile device, e.g. A/S center facsimile device, is in a remote control mode. If the remote control mode is established, the remote control facsimile device requests a telephone number of the remote facsimile device to be entered via the keyboard, and then checks the entrance of the telephone number.

In a second step, when the telephone number is entered in the first step, a memory reading menu is displayed. And then the pressing of YES and NO keys is checked so as to check the memory reading mode selection. In a third step, if the memory reading mode is selected in the second step, the assigned data is read from memory of the remote facsimile device and its result is printed and the process ends. In a fourth step, if the memory reading mode is not selected in the second step, a memory writing menu is displayed. And then the pressing of the YES and NO keys is checked so as to check the memory writing mode selection.

In a fifth step, if the memory writing mode is selected in the fourth step, changed data is written in the memory of the remote facsimile device and its result is printed and the process ends. In a sixth step, if the memory writing mode is not selected in the fourth step, a remote diagnosis menu is displayed. And then the pressing of the YES and NO keys is checked so as to check the remote diagnosis mode selection.

In seventh step, if the a remote diagnosis mode is selected in the sixth step, the state of the remote facsimile device is diagnosed and its result is printed and the process ends. In an eighth step, if the remote diagnosis mode is not selected in the sixth step, a name registration menu is displayed. And then the pressing of the YES and NO keys is checked so as to check the name registration mode selection. In a ninth step, if the name registration mode is selected in the eighth step, name registration data stored in memory of the center facsimile is transmitted to the remote facsimile and the process stops after printing the result. However, in a tenth step, if the name registration mode is not selected in the eighth step, a telephone number registration menu is displayed. And then the pressing of the YES and NO keys is checked so as to check the telephone number registration mode selection.

In an eleventh step, if the telephone number registration mode is selected in the tenth step, the telephone number registration data stored in memory of the center facsimile is transmitted to the remote facsimile and the process stops after printing the result. In a twelfth step, if the telephone number registration mode is not selected in the tenth step, an option reading menu is displayed. And then the pressing of the YES and NO keys is checked so as to check the option reading mode selection.

In a thirteenth step, if the option reading mode is selected in the twelfth step, the center facsimile reads option data from the remote facsimile device and the process stops after printing the result. In a fourteenth step, however, if the option reading mode is not selected in the twelfth step, the process proceeds to the memory reading selection process of the second step so as to repeatedly perform the foregoing procedures.

Figure 3:
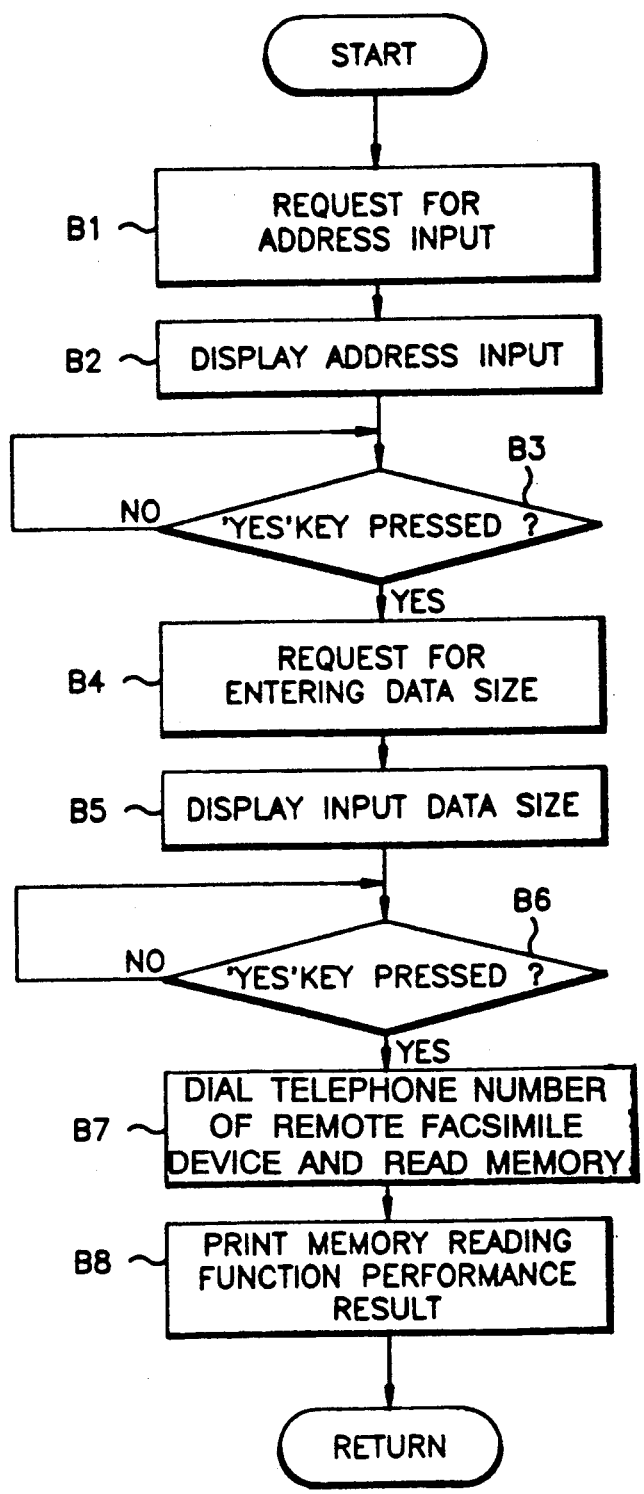
FIG. 3 is a data reading flow chart of FIG. 2.

FIG. 3 is a flow chart for reading and printing assigned data stored in the memory of the remote facsimile device.

Figure 4:
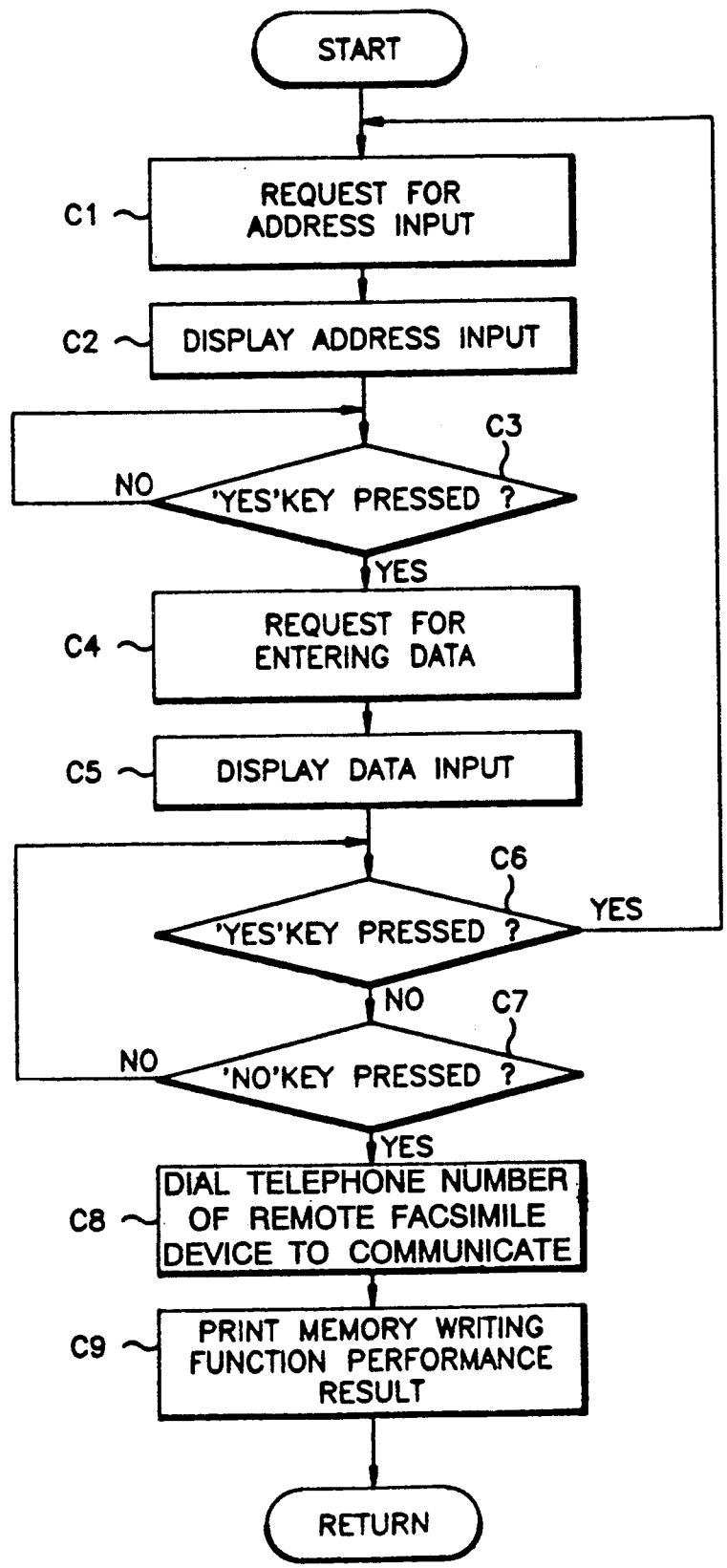
FIG. 4 is a data writing flow chart of FIG. 2.

FIG. 4 is a flow chart for writing the changed data in the memory of the remote facsimile device and printing its result.

FIG. 5 represents transmission controlling protocol during data communication between the remote facsimile device and the center facsimile device using the non-standard format recommended by the CCITT regulation.

FIG. 6A represents a data format when data is transferred between the remote and center facsimile devices according to the protocol as shown in FIG. 5. The data format has a request code, a memory header address, a number representing bytes of request data, data, and end code of data. Here, the request code represents request content according to each remote-control function as shown by an example setting of the following Table 1.

TABLE 1

| CONTENT | REQUEST CODE (HEXADECIMAL) |
| --- | --- |
| data reading request | C1 |
| data reading acknowledgment | A1 |
| data change request | C2 |
| data change acknowledgment | A2 |
| diagnosis request | C3 |
| diagnosis acknowledgment | A3 |

The memory header address specifies the address of memory expressing the requested data. The number of bytes of the request data specifies the number of bytes of requested data and is set to the default byte when not specified. The requested data represents data corresponding to each request code and the respective requested data is established such that it is divided into a specific number of bytes. The end code specifies the end of data. And the data reading request, the data change request, and the diagnosis request are request codes which the center facsimile device requests according to each type to the remote facsimile device, and the data reading acknowledgment, the data change acknowledgment, and the diagnosis acknowledgment are acknowledgment codes acknowledged by the remote facsimile device to the center facsimile device. FIG. 6B is memory map of allocation of the built-in memory of the center facsimile device composed as shown in FIG. 1, the memory map includes a transmission term identification (hereinafter referred to as TTI) region 11 for registering the telephone number and name, a telephone number region 12 for temporarily storing the remote facsimile device telephone number to be dialed, a performance result storing region 13 for storing data to be printed after performance of each function, and a print data region 14 for storing print data for printing the result data of performance on paper.

The operation of the present invention as shown in FIGS. 2A-2C, 3 and 4 will now be described with reference to FIGS. 1,5 and 6.

When the system is supplied with power source, the CPU 20 of the center facsimile device as shown in FIG. 1 checks whether or not the function performance key is pressed in step A1 of FIG. 2A. If an user (A/S worker) presses a predetermined key by the keyboard 10 for performance of remote-control function, whether remote control mode is established or not is checked in step A2. If the remote-control mode is established, step A3 is performed. In this case, since the remote-control function is authorized to A/S workers only, a password is given. In the step A3, input request of the telephone number of the remote facsimile device to be remote-controlled is made by displaying the request by the control of the display unit 50, and then step A4 is performed. In the step A4, whether telephone number is entered or not is checked. If the user finishes entering the telephone number using the keyboard 10, the input telephone number is stored in the telephone number region 12 of the internal memory having the regions as shown in FIG. 6B, and then step A5 is performed. In the step A5, the memory reading menu is displayed by the display unit 50. In step A6, whether or not the YES key is pressed is checked, and if the YES key is pressed, the memory reading routine is executed as shown in FIG. 3 by proceeding to A7, since it means that the user has chosen memory reading function. In this case, the YES key is pressed by the user by operating the keyboard 10 when the user wants to select memory reading function displayed by the display unit 50, and the NO key is pressed when other function is to be selected.

Accordingly, in step B1 of FIG. 3, address input request is displayed by the display unit 50 for the data stored in the memory of the remote facsimile device in which the user wants to read and verify, and in step B2, digits corresponding to the address pressed by the user using the keyboard 10 are displayed for verification by the user. In this case, the user presses the address in a specific number of digits by operating the keyboard 10 while verifying the state of the above display. In step B3, whether or not the YES key is pressed is checked, and if the YES key is pressed, that is if the user confirms the displayed address and presses the YES key on the keyboard 10, step B4 is performed. In the step B4, the size input request of the data to be read is displayed by the display unit 50. Furthermore, in step B5, the digits corresponding to the input size pressed by the user is displayed for the user's confirmation and step B6 is executed. In this case, the data size refers to the size of the data to be read starting from the address input. In the step B6, whether or not the YES key is pressed is checked, and if the YES key is pressed, that is when the user confirms the displayed address and presses the YES key by the keyboard 10, step B7 is executed. In the step B7, the data stored in the remote facsimile device is read by communicating in data format as shown in FIG. 6A according to the transmission controlling protocol shown in FIG. 5, after dialing the telephone number stored in the telephone number region 12 as shown in FIG. 6B through LIU 30. The data communication is conducted as illustrated in FIG. 5.

As stated above data communication is described with reference to FIG. 5. Firstly, when a call is made by dialing the remote facsimile device from the center facsimile device, the remote facsimile device sends non-standard facilities (hereinafter referred to as NSF) called subscriber identification (hereinafter referred to as CSI) plus digital identification signal (hereinafter referred to as DIS) to the center facsimile device. Then, for data communication, the center facsimile device confirms the line connection acknowledgment and requests data by sending non-standard facilities command (hereinafter referred to as NSC) including request command and data to the remote facsimile device, and the remote facsimile device sends NSC including acknowledgment command and data to the center facsimile device. After receiving this data, the center facsimile device sends disconnect (hereinafter referred to as DCN) to the remote facsimile device when all data is correct after verification so as to request for switching communication lines, and then the remote facsimile device switches communication line to complete the communication. The communication data is modulated and demodulated by the modem 40. The result of the data reading according to the data communication described in the foregoing is stored in the performance result storing region 13 of the internal memory shown in FIG. 6B. In the step B8, the memory reading function performance result which is stored in the performance result storing region 13 of the internal memory as shown in FIG. 6B is converted to data ready to be printed on paper. The converted data is stored in the print data region 14 as shown in FIG. 6B. The converted and stored print data is applied to the recording unit 60 and then the process ends after printing the print data on a paper with certain format to allow the user to verify the result. The paper changes according to a selected printing method, and if the center facsimile device uses a thermal print head (T.P.H), it uses thermal sensitive paper for printing.

Meanwhile, if the YES key is not pressed in the step A6, the NO key input is checked in step A8. If the NO key is pressed in the step A8, step A9 is performed and a memory writing menu is displayed by the display unit 50. In step A10, whether or not the YES key is pressed is checked, and if it is pressed, step A11 is performed for executing the memory writing routine shown in FIG. 4, since the user selects the memory writing function for changing the data stored in the memory of the remote facsimile device.

Accordingly, in step C1 of FIG. 4, the user displays through the display unit 50, the input request of an assigned address for the memory of the remote facsimile device that the user wants to write the changed data in, and digits of the address which is pressed by the user by operating the keyboard 10 to allow verification by the user is displayed in step C2. In step C3, whether or not the YES key is pressed is checked, and if it is pressed, that is if the user confirms the displayed address and presses the YES key on the keyboard 10, the data input request of the data to be written is displayed by the display unit 50 in step C4. In step C5, the digits corresponding to the input data pressed by the user is displayed for the user's confirmation and step C6 is executed. In the step C6, whether or not the YES key is pressed is checked, and if it is pressed, that is if the user confirms the displayed data and presses the YES key on the keyboard 10, data for the next address is entered by returning to step C1 and repeating the foregoing procedure. Therefore, all the data and address to be written is entered. In the step C7, if the YES key is not pressed in the step C6, it is determined whether or not the NO key is pressed. When the NO key is pressed in the step C7, that is if the user presses the NO key on the keyboard 10 after completing the data input, step C8 is performed. In the step C8, the data stored in the remote facsimile device is changed by communicating in data format as shown in FIG. 6A according to the transmission controlling protocol shown in FIG. 5, after dialing the telephone number of the remote facsimile device stored in the telephone number region 12 as shown in FIG. 6B through LIU 30. In this case, the data communication is conducted in the same way as described in the memory reading process. After storing the result of data writing through data communication as in the performance result storing region 13 of the internal memory as shown in FIG. 6B, step C9 is performed. In the step C9, the result of the memory writing performance stored in the above performance result storing region 13 is printed in the same manner as described in the memory reading process, and the process ends.

Meanwhile, if the YES key is not pressed in step A10, the NO key input is checked in step A12, and if the NO key is pressed, the remote diagnosis menu is displayed by the display unit 50 by proceeding to step A13. In step A14, whether or not the YES key is pressed is checked, and if it is pressed, the user may select the remote diagnosis mode to diagnose the state of the remote facsimile device. Step A15 is performed for diagnosing the state of devices such as read-only memory, random access memory and lamp of the remote facsimile device according to the key input of the user, and the process ends after printing the result. In order to remotely diagnose, the process of data communication and printing is conducted in the same manner as described in the memory reading process. Here, the distinction of the result of the diagnosis can be made by identifying the data in the data format such that when the data is 00, it can be identified as being normal and when the data is OFFH, it can be identified as malfunction.

If the YES key is not pressed in the step A14, the NO key input is checked in the step A15 and if the NO key is pressed, step A17 is performed and a name registration menu is displayed by the display unit 50. In step A18, whether or not the YES key is pressed is checked, and if it is pressed, the user may select the name registration function for registering the name of the host machine type, so step A19 is performed for registering the name data inputted to the TTI region 11 which corresponds to the telephone number of the remote facsimile device stored in the telephone number region 12 as shown in FIG. 6B according to the key input of the user, and the process ends after sending the name data to the remote facsimile device and printing the result.

Here, the process of data communication and printing for registering name is conducted in the same manner as described in the memory reading process.

If the YES key is not pressed in the step A18, the NO key input is checked in step A20 and if the NO key is pressed, step A21 is performed and the telephone number registration menu is displayed by the display unit 50. And in step A22, whether or not the YES key is pressed is checked, and if it is pressed, the user may select the telephone number registration function for registering the telephone number of the host machine type, so step A23 is performed for registering the telephone number data inputted to the TTI region 11 which corresponds to the telephone number of the remote facsimile device stored in the telephone number region 12 as shown in FIG. 6B according to the key input of the user, and the process ends after sending the telephone number to the remote facsimile device and printing the result. Here, the process of data communication and printing for registering the telephone number is conducted in the same manner as described in the memory reading process.

If the YES key is not pressed in the step A22, the NO key input is checked in step A24 and if the NO key is pressed, step A25 is performed and the option reading menu is displayed by the display unit 50. In step A26, whether or not the YES key is pressed is checked, and if it is pressed, the user may select the option reading menu for checking the state of various optional function settings of the remote facsimile device, so step A27 is performed for reading various optional function setting data according to the key input of the user, and the process ends after printing the result. The process of data communication and printing for reading the option data is conducted in the same manner as described in the memory reading process. The printing of the option result is done so that the user can easily read the result for each optional function item. If the YES key is not pressed in the step A26, the NO key input is checked in step A28 and if the NO key is pressed in the step A28, the process proceeds to step the A5 for repeating the procedures described in the foregoing.

In each of the procedures described in the foregoing, the input of the keys on the keyboard 10 which can be pressed by the user (A/S worker) is the alphabet from A to Z, arabic numbers from 0 to 9, and inputs of * and # etc.

Meanwhile, the supply of low-cost facsimile devices having no LCD windows is expected to increase rapidly by looking at the current trend, and by accordingly performing the remote-control function as described in the foregoing, service cost and time can be effectively reduced and A/S claim due to mishandling of the facsimile devices by users can be minimized.

As described in the foregoing, the present invention provides a method for interactively diagnosing and controlling the state of remote facsimile devices by the facsimile devices of A/S centers, by data communicating with the remote facsimiles using non-standard format recommended by CCITT regulation, thus an advantage is reducing A/S cost and the time spent. Another advantage is solving general problems concerning A/S by just one phone call, and printing on paper each result according to the type of remote-control for easy identification to perform effective A/S.

While the invention has been particularly shown and described with reference to a preferred embodiment, it will be understood by those skilled in the art that modifications in detail may be made without departing from the spirit and scope of the invention.

What is claimed is:

1. A method for remote-controlling a remote facsimile device from a center facsimile device located at an after-service center, said center facsimile device having a keyboard, a central processing unit for controlling the center facsimile device according to pressing keys of said keyboard, a line interface unit for interfacing signals transmitted and received via a transmission line by control of said central processing unit, a modem coupled between said central processing unit and said line interface unit for modulating and demodulating said signals into/from said central processing unit, a display unit for displaying information by control of said central processing unit, and a printer for printing said information by control of said central processing unit, said method comprising the steps of:

(A) requesting entry of a telephone number of the remote facsimile device after checking whether a remote-control mode is established when a function key corresponding to a remote-control function is pressed, and checking whether said telephone number is entered;

(B) determining that a memory reading process is selected when a YES key is activated and determining that the memory reading process is not selected when a NO key is activated after displaying a memory reading menu if the telephone number is entered in said step (A);

(C) ending the method after reading data stored in a memory of said remote facsimile device and printing a read result if the memory reading process is selected in said step (B);

(D) determining that a memory writing process is selected when the YES key is activated and determining that the memory reading process is not selected when the NO key is activated after displaying a memory writing menu if the memory reading process is not selected in said step (B);

(E) ending the method after writing data into the memory of said remote facsimile device and printing a write result if the memory writing process is selected in said step (D);

(F) determining that a remote diagnosis process is selected when the YES key is activated and determining that the remote diagnosis process is not selected when the NO key is activated after displaying a remote diagnosis menu if the memory writing process is not selected in said step (D);

(G) ending the method after diagnosing a state of said remote facsimile device and printing a diagnostic result if the remote diagnosis process is selected in said step (F);

(H) determining that a name registration process is selected when the YES key is activated and determining that the name registration process is not selected when the NO key is activated after displaying a name registration menu if the remote diagnosis process is not selected in said step (F);

(I) ending the method after sending name registration data stored in a memory of the center facsimile device to said remote facsimile device and printing a name registration result if the name registration process is selected in said step (H);

(J) determining that a telephone number registration process is selected when the YES key is activated and determining that the telephone number registration process is not selected when the NO key is activated after displaying a telephone number registration menu if the name registration process is not selected in said step (H);

(K) ending the method after sending telephone number registration data stored in the memory of the center facsimile device to said remote facsimile device and printing a telephone number registration result if the telephone number registration process is selected in said step (J);

(L) determining that an option reading process is selected when the YES key is activated and determining that the option reading process is not selected when the NO key is activated after displaying an option reading menu if the telephone number registration process is not selected in said step (J);

(M) ending the method after reading option data of said remote facsimile device and printing an option data result if the option reading process is selected in said step (L); and (N) proceeding to step (B) for repeatedly performing the steps (B) through (N), if the option reading process is not selected in said step (L).

2. The method of claim 1, wherein said step (C) comprises the steps of:
(A1) determining whether the YES key is activated after displaying an address input request of the data to be read from said remote facsimile device and then displaying an entered address corresponding to the data to be read;
(B1) determining whether the YES key is activated after requesting input data size of the data to be read and then displaying the entered input data size if the YES key is pressed in said step (A1);
(C1) reading said data of said remote facsimile device after communicating in a given data format according to a transmission controlling protocol by dialing to said remote facsimile device if the YES key is activated in said step (B1); and
(D1) ending the method after printing the read result of the data read in said step (C1).

3. The method of claim 1, wherein said step (E) comprises the steps of:
(A2) determining whether the YES key is activated after displaying an address input request of the data to be written to said remote facsimile device and then displaying an entered address corresponding to the data to be written;
(B2) determining whether the YES key is activated after requesting input of the data to be written and then displaying the input data to be written if the YES key is activated in said step (A2);
(C2) proceeding to said step (A2) if the YES key is activated and determining whether the NO key is activated if the YES key is not activated in said step (B2);
(D2) changing stored data of said remote facsimile device by writing the input data after communicating in a given data format according to a transmission controlling protocol by dialing to said remote facsimile device if the NO key is activated in said step (C2); and
(E2) ending the method after printing the write result of the data written in said step (D2).

4. The method of claim 2, wherein said data format comprises:

a request code corresponding to said remote control function;
a memory header address specifying an address of said memory corresponding to said data to be read;
a number bytes of the data to be read;
said data to be read corresponding to said request code; and
an end code specifying an end of said data to be read.

5. The method claim 3, wherein said data format comprises:
a request code corresponding to said remote control function;
a memory header address specifying an address of memory for writing said data;
a number of bytes of the data to be written;
said data to be written corresponding to said request code; and
an end code specifying an end of said data to be written.

6. A method of controlling a remote facsimile device from a local facsimile device, said method comprising the steps of:
determining if a remote control function is selected;
when the remote control function is selected, requesting a telephone number of the remote facsimile device;
when the telephone number is received, displaying a memory reading menu;
when a YES key of a keyboard of the local facsimile device is pressed, performing a memory reading process and ending the method;
when a NO key of the keyboard is pressed, displaying a memory writing menu;
when the YES key is pressed, performing a memory writing process and ending the method;
when the NO key is pressed, displaying a remote diagnosis menu;
when the YES key is pressed, performing a remote diagnosis process, printing a remote diagnostic result, and ending the method;
when the NO key is pressed, displaying a name registration menu;
when the YES key is pressed, transmitting data stored in a memory of said local facsimile device to the remote facsimile device, printing a name registration result, and ending the method;
when the NO key is pressed, displaying a telephone number registration menu;
when the YES key is pressed, transmitting data stored in the memory of said local facsimile device to the remote facsimile device, printing a telephone number registration result, and ending the method;
when the NO key is pressed, displaying an option reading menu;
when the YES key is pressed, printing an option data result and ending the method; and
when the NO key is pressed, returning to the step of displaying a memory reading menu.

7. The method of claim 6, wherein said memory reading process comprises the steps of:
requesting an address of data to be read from said remote facsimile device;
displaying said address when received;
if the YES key is pressed, requesting data size of the data to be read;
displaying said data size when received;
if the YES key is pressed, dialing the telephone number of the remote facsimile device;

communicating with the remote facsimile device in a given data format according to a transmission controlling protocol;

printing the read result in dependence upon the given data format; and ending the method.

8. The method of claim 6, wherein said memory writing process comprises the steps of:

requesting an address for writing data into a memory of said remote facsimile device;

displaying said address when received;

if the YES key is pressed, requesting said data to be written;

displaying said data when received;

if the YES key is pressed, returning to the step of requesting an address for writing data to obtain a next address;

if the NO key is pressed, communicating with the remote facsimile device in a given data format according to a transmission controlling protocol;

writing said data into said address of the remote facsimile device;

printing the write result; and ending the method.

9. The method of claim 7, wherein said data format comprises:

a request code corresponding to said remote control function;

a memory header address specifying an address of said memory corresponding to said data to be read;

a number of bytes of the data to be read;

said data to be read corresponding to said request code; and an end code specifying an end of said data to be read.

10. The method of claim 8, wherein said data format comprises:

a request code corresponding to said remote control function;

a memory header address specifying an address of memory for writing said data;

a number of bytes of the data to be written;

said data to be written corresponding to said request code; and an end code specifying an end of said data to be written.

* * * * *

UNITED STATES PATENT AND TRADEMARK OFFICE
CERTIFICATE OF CORRECTION

PATENT NO. : 5,226,074
DATED : July 6, 1993
INVENTOR(S): Sang-Ho Han

It is certified that error appears in the above-indentified patent and that said Letters Patent is hereby corrected as shown below:

Column 1,

Line 58,    change "or and" to --or an--;

Column 7,

Line 59,    change "facsimiles" to --facsimile devices--.

Signed and Sealed this

Sixteenth Day of August, 1994

Attest:

BRUCE LEHMAN

*Attesting Officer*    *Commissioner of Patents and Trademarks*